Patented June 17, 1930

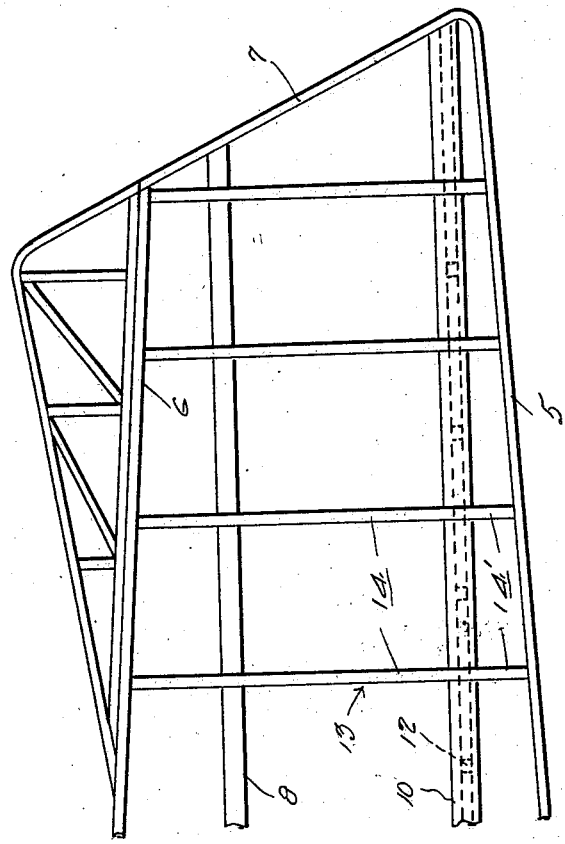
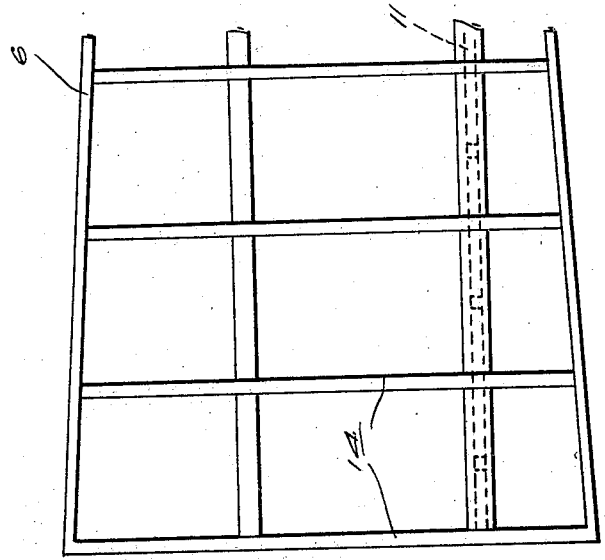

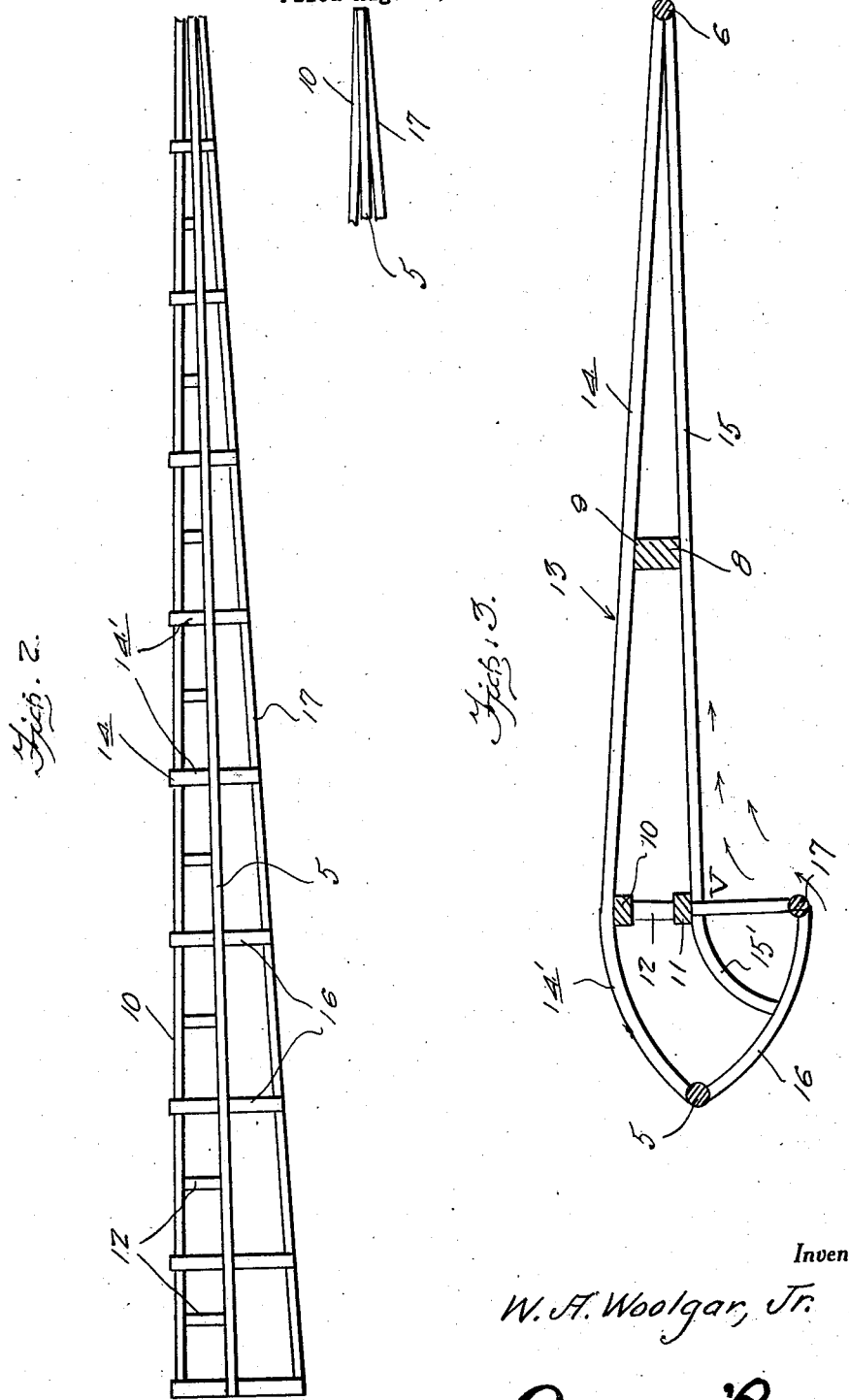

1,765,189

UNITED STATES PATENT OFFICE

WILLIAM ARTHUR WOOLGAR, JR., OF DETROIT, MICHIGAN

AEROPLANE-WING CONSTRUCTION

Application filed August 12, 1929. Serial No. 385,134.

This invention relates to certain new and useful improvements in aeroplane wing construction and has as its primary object the provision of an aeroplane wing, whose frame is so formed as to provide for the wing an upper rearwardly and downwardly inclined surface, inclining from the leading to the trailing edge of the wing, together with a substantially flat horizontal bottom surface, the forward or leading edge of the wing presenting a rounded convex outer surface extending downwardly at right angles to the horizontal plane of the bottom surface of the wing so that, when completed, and the covering material is disposed about the frame of the wing there will be provided on the under surface of the wing a substantially flat horizontal surface beginning inwardly from the leading edge of the wing and terminating at the trailing edge of the wing, together with a vertical substantially flat surface extending at right angles to the horizontal surface, and constituting therewith a vacuum pocket at the forward portion of the wing.

A still further object of the invention is to provide a wing constructed in the manner above set forth, and wherein the wing tapers longitudinally of its length having its reduced end remote from the fuselage of the aeroplane, and the frame portion constituting the leading edge of the wing and providing the vertical surface being of such formation as to result in a gradual taper of the vertical surface longitudinally of the wing, the reduced end of the vertical surface merging into the wing proper at the reduced end of the wing, with the result that the vacuum pocket tapers longitudinally in conformity with the structure of the wing, thus affording a larger surface for the air pressure to act upon the wing at that portion of the wing nearer to the fuselage, thus greatly enhancing the lifting power of the aeroplane enabling the plane to rise under loads heavier than than normally under its usual engine power.

With the above and numerous other objects in view as will become apparent as the description proceeds, the invention resides in certain novel features of construction hereinafter to be more fully described, together with the operation thereof, reference being had to the accompanying drawings, wherein:

Figure 1 is a top plan view of an aeroplane wing frame constructed in accordance with the present invention.

Figure 2 is an edge elevation of the same looking at the frame structure along its leading edge.

Figure 3 is a transverse detail view partly in section and partly in elevation.

With reference more in detail to the drawings, it will be seen that my improved aeroplane frame comprises a pair of longitudinal extending cylindrical frame members 5 and 6 respectively. The longitudinal member 5 may be designated as the leading longitudinal frame member, while the member 6 may be termed the rear longitudinal frame member. The members 5 and 6 gradually converge toward one another at that end of the same which will be disposed remote from the fuselage of the aeroplane, and the forward frame member 5 is of a length greater than the length of the rear frame member 6 and at the remote end of the frame projects beyond the adjacent end of the said member 6, as shown to advantage in Figure 1.

At that end of the frame remote from the fuselage, the members 5 and 6 are connected through the medium of an end cross frame member 7. A single bar 8 extends longitudinally of the frame intermediate the members 5 and 6 and at one end the bar 8 is suitably secured to the end member 7 adjacent the trailing edge of the same. It is to be noted spar 8 has its longitudinal undersurface substantially straight or flat, while its top surface is bevelled to slope rearwardly as at 9.

Extending longitudinally of the wing frame adjacent the leading edge of the frame is a pair of upper and lower wing spars 10 and 11 respectively. The upper and lower spars 10 and 11 gradually converge longitudinally toward one another at one end, and at said one end are secured in any suitable manner to the end frame member 7 of the forward end of the said member 7. For maintaining the bars 10 and 11 in spaced relation there is employed a plurality of suitably spaced vertical supporting stanchions 12 arranged between upper and lower spars 10 and 11.

Of course the supporting stanchions 12 graduate in length as they are continued to the outer or what may be termed the free end of the wing frame.

The said upper and lower spars 10 and 11 extend in somewhat spaced parallelism to the intermediate spar 8. The transverse supporting ribs for the wing frame are designated generally by the reference character 13. Each of the ribs comprise an upper and lower member 14 and 15 respectively. Of course, these ribs 13 are disposed in spaced relation longitudinally of the frame. The upper member 14 of the respective ribs 13 are secured at one end to the rear longitudinal frame member 6, and the member is adapted to rest on the sloping surface of the intermediate bar 8, and the upper bar 10 with the result that the member 14 inclines downwardly and rearwardly from the leading edge to the trailing edge of the wing.

At its forward end the member 14 is curved downwardly and forwardly as at 14' and at its end is secured in any well known or desired manner to the forward longitudinal frame member 5. Of course, the member 14 may be secured to the spars 8 and 10 respectively in any suitable or desired manner. The lower rib member 15 which of course is disposed directly beneath the upper member 14 is disposed in a substantially horizontal plane, and at one end is connected to the rear longitudinal frame member 6 and at its intermediate portion to the undersurface of the spar 8, while at its forward end is suitably secured to the underface of the forward spar member 11.

Likewise the member 15 at its forward end is provided with a downwardly and forwardly curved portion 15', the curve 15' being more pronounced than the curved end 14' of the upper rib member as illustrated to advantage in Figure 3.

To complete the leading edge of the frame there is provided a plurality of arcuate-shaped connecting members 16. These connecting members 16 are secured at one end to the forward longitudinal frame member 5, and there is one of said arcuate members 16 to each of the ribs 13. These arcuate members 16 extend downwardly and rearwardly of the frame and have their intermediate portion connected to the terminal of the curved extremity 15' of the lower rib member 15. The inner end of each of the arcuate member 16 terminate substantially on a vertical line with the upper and lower spar members 10 and 11.

An elongated tubular connecting rod or bar 17 is secured to the inner end of the arcuate members 16 and this bar 17 extends horizontally and longitudinally through the frame structure. Furthermore, the member 17 is substantially parallel to, and extends for its full length directly beneath the lower spar member 11. Additional vertical supporting staunchions 18 depend from the lower spar 11 and in longitudinal spaced alinement being spaced apart about the same distance as the ribs 13. At their lower end the staunchions 18 are secured to the connecting rod 17.

Like the stanchions 12, the last mentioned stanchions 18 graduate in length as they are continued to the outer end of the frame structure, while the connecting bars 17 at one end is connected to the end frame member 7 directly beneath the lower spar 11.

Obviously when the structure is completed and its several parts assembled in this manner, a suitable covering material such as is well known in the art in present day use will be disposed about the frame, and it may be well to here mention that the covering will extend upwardly against the side of the supporting stanchions 18 in order to provide a vertical wall surface, and then will be continued transversely of the frame up against the bottom surfaces of the lower rib members 15 to provide a substantially flat bottom surface for the wings.

Thus it will be seen that the completed wing will present an upper rearwardly inclined surface at the top of the wing, a curved leading edge, a vertical surface extending longitudinally of the wing inwardly from the leading edge of the wing, which longitudinal surface gradually diminishes transversely as it is continued toward the outer or free end of the wing, together with a substantially flat bottom surface extending at substantially right angles to the vertical surface and at this bottom surface gradually tapers in cross section to the outer or free end of the wings.

In operation the air within the path of the wings will strike against the upper and lower curved surfaces at the leading edge of the wing, the air striking the lower curved surface at said leading edge being directed downwardly and rearwardly beneath the wing. The air thus acted upon will provide at the juncture of the vertical and horizontal surfaces beneath the wing a vacuum pocket designated as at B.

The vacuum spaced formed by the air acted upon in this manner together with the vertical wall or surface and the horizontal surface will thus decrease with the taper of the vertical wall toward the outer end of the wing. Obviously then the pressure is gradually reduced and the strain lessened upon the wing toward the outer end or tip of the wing. The top surface of the wing which of course also tapers towards the outer free end or tip of the wing will act as a support in proportion to the decreasing pressure, such construction also allowing of a larger vacuum space beneath the wing at the portion of the wing adjacent the fuselage, thus the wing at this point being wider presents a larger surface for the air pressure to act upon, the surface of course gradually decreasing with the decrease in the air pressure and vacuum toward the end or tip of the wing.

As in all aeroplane wing constructions, a partial vacuum is formed on the top surface thereof, whereas with this construction an added or doubled vacuum and increased pressure is afforded acting in a direction almost straight up against the horizontal flat bottom surface of the wing, which surface being nearly flat as just mentioned offers little or no resistance to the air, after the air has given off the lifting ability due to the speed of the plane. Then too, it will be noted that the greater pressure of the air is directed at the leading edge of the wing at the undersurface of the leading-edge of said wing. This is of course, due to the fact that the arcuate members 16 provide a more abrupt curve to this surface than the curved terminals 14' of the upper members of the rib 13 give to the top surface of the wing at the leading edge.

The pressure on the bottom surface of the wing at the leading edge acts to counteract the pressure on the flat surface at the bottom of the wing. Thus the pressure is equalized considerable throughout the entire lower surface, which also aids in maintaining the nose of the wing in the desired position. Obviously, the greater the speed of the plane, the greater the vacuum and vacuum space, and the greater the pressure on the flat bottom surface of the wing the greater will be the lifting power of the aeroplane.

It is believed that from a study of the foregoing, taken in connection with the accompanying drawings, a clear understanding of the construction, operation, and advantages of a wing of this nature will be clear to those sufficiently skilled in this art without a more detailed description.

Even though I have herein shown and described the preferred embodiment of my invention, it is to be understood that the same is susceptible to certain changes fully comprehended by the spirit of the invention, and the scope of the appended claims.

Having thus described my invention, what I wish to claim is:

1. An aeroplane wing embodying a frame comprising a pair of longitudinal strips gradually converging toward each other at the tip of the wing, one of the strips being of a length greater than the other of said strips, and said one strip projecting beyond the adjacent ends of said other strip at the tip of the wing, a transverse strip connecting said ends of the first mentioned strip, longitudinally spaced transverse rib frames secured at their ends to said longitudinal strip, each of said rib frames comprising upper and lower opposed members, the upper member of said rib curving downwardly at the leading edge of the wing, the lower member at said rib curving downwardly and forwardly at the leading edge of said wing, an arcuate shaped connecting member secured to the terminals of the upper and lower rib members, said arcuate connecting members having their free ends extending inwardly of the frame, a longitudinally extending bar secured to said ends of said arcuate connecting members, and longitudinally spaced vertical supporting stanchions secured at their upper ends to the frame adjacent the lower rib members, said supporting stanchions at their lower end being secured to the last mentioned longitudinal bar opposite the end of the respective arcuate connecting members.

2. An aeroplane wing tapering longitudinally and having an upper rearwardly inclined surface and a bottom horizontal substantially flat surface, the trailing edge of the wing having a bottom surface extending inwardly and merging into a vertical surface extending longitudinally of the wing and at right angles to the bottom surface of the wing, the width of the vertical surface gradually diminishing longitudinally as it continues towards one end of the wing in proportion to the taper of the wing at the under horizontal surface of the wing.

3. An aeroplane wing embodying a frame comprising a pair of longitudinal strips gradually converging toward each other at the tip of the wing, a transverse strip connecting the ends of the first mentioned strip of the tip of the wing, longitudinally spaced transverse rib frames secured at their ends to said longitudinal strip, each of said rib frames comprising upper and lower opposed members, the upper member of said rib curving downwardly at the leading edge of the wing, the lower member of said rib curving downwardly and forwardly at the leading edge of said wing, an arcuate shaped connecting member secured to the terminals of the upper and lower rib members, arcuate connecting members having their free ends extending inwardly of the frame, a longitudinally extending bar secured to said ends of said arcuate connecting members.

4. An aeroplane wing embodying a frame structure, a plurality of spaced rib frames extending transversely of the first mentioned frame, said rib frame members comprising upper and lower members converging rearwardly, the converging ends of said rib frame members being secured to a longitudinal frame member of the first mentioned frame, the forward end portion of said upper and lower member of said rib frames being spaced apart, said upper and lower rib frame members at their last mentioned ends terminating in downwardly curved end portions, arcuate shaped connecting members secured to the last mentioned end of said upper and lower frame members, said arcuate connecting members having their free ends extending inwardly of the frame, a longitudinally extending bar secured to said end of one of said arcuate connecting members, and longitudinally spaced vertical supporting stanchions depending from said first mentioned frame adjacent the lower rib members, said supporting stanchions at their lower ends being secured to the last mentioned longitudinal bar opposite the ends of the respective arcuate connecting members.

5. An aeroplane wing embodying a frame comprising a pair of longitudinally extending front and rear frame members, an end cross frame member secured at its opposite end at the adjacent ends of the first mentioned frame members at one end of the frame, a pair of upper and lower elongated wing spars extending longitudinally of the frame rearwardly of said front longitudinal frame member, said upper and lower wing spars gradually converging longitudinally toward one another, the converging ends of said wing spars secured to said end frame members, spacing stanchions between said upper and lower frame bars, a plurality of spaced transverse rib frames, each of said rib frames comprising an upper frame member secured at one end to the rear longitudinal frame member and at their forward ends curving downwardly and outwardly, the forward end of said upper rib frame members being secured to the forward longitudinally extending frame member, the lower frame members of each of said rib frame being secured at one end to said rear longitudinal frame member opposite to said upper rib frame members, said lower rib frame members at their forward ends curving downwardly and inwardly, arcuate connecting members secured to said forward longitudinal frame member and to the terminals of said downwardly and inwardly curved end of said lower rear frame members, said arcuate members having their free ends extending inwardly of said first mentioned frame, a longitudinally extending bar secured to said ends of said arcuate connecting members, supporting stanchions secured at their upper ends to the lower wing spar, and said supporting stanchions at their lower ends being secured to the last mentioned longitudinal bar opposite the end of the respective arcuate connecting members.

In testimony whereof I affix my signature.

WILLIAM ARTHUR WOOLGAR, Jr.